Figures 1, 2, 3:
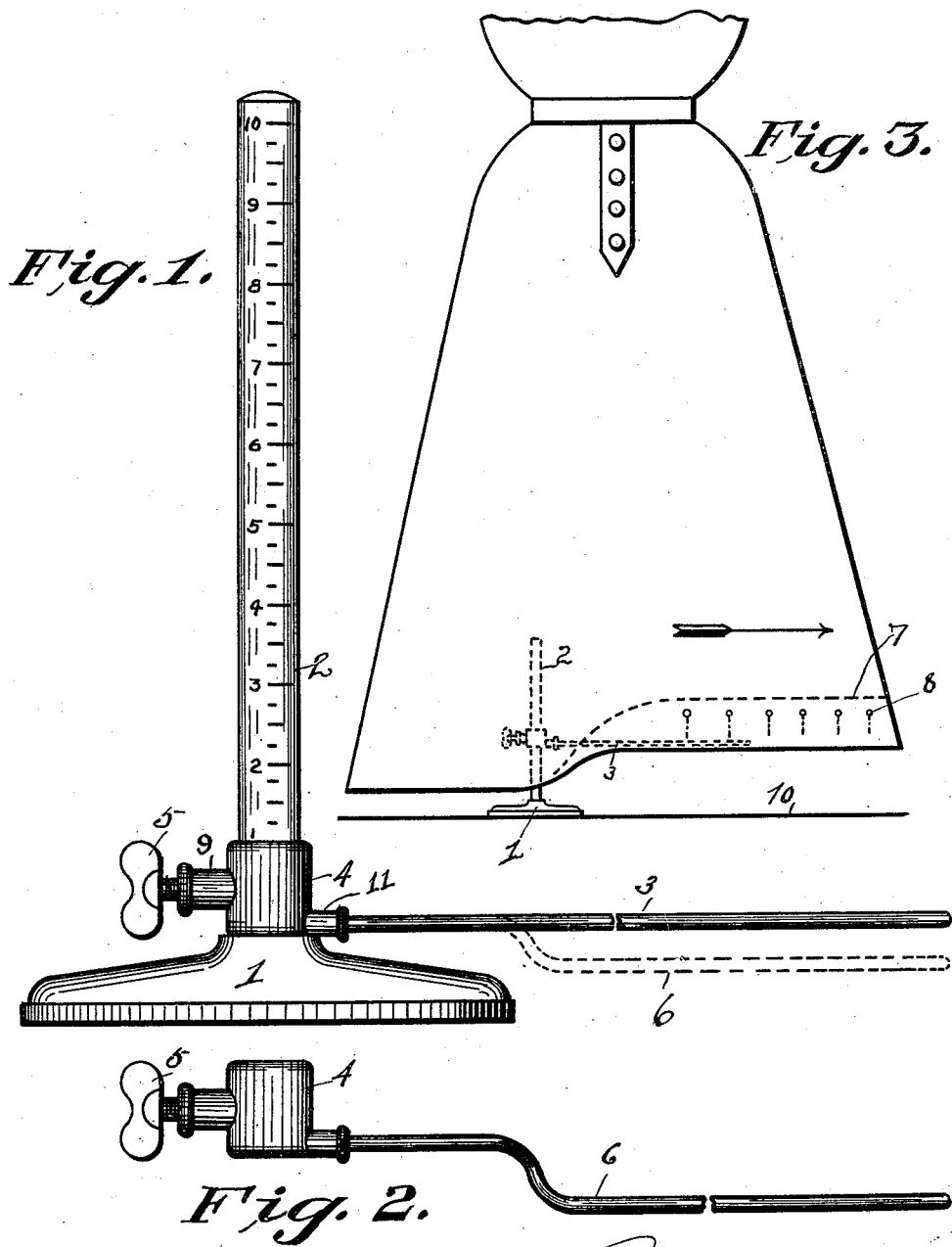

C. WETZ.
SKIRT GAGE.
APPLICATION FILED JAN. 7, 1907.

914,542. Patented Mar. 9, 1909.

UNITED STATES PATENT OFFICE.

CARRIE WETZ, OF DAYTON, OHIO.

SKIRT-GAGE.

No. 914,542.  Specification of Letters Patent.  Patented March 9, 1909.

Application filed January 7, 1907. Serial No. 351,248.

*To all whom it may concern:*

Be it known that I, CARRIE WETZ, a citizen of the United States, residing at Dayton, in the county of Montgomery and State of Ohio, have invented certain new and useful Improvements in Skirt-Gages; and I do declare the following to be a full, clear, and exact description of the invention, such as will enable others skilled in the art to which it appertains to make and use the same, reference being had to the accompanying drawings, and to the figures of reference marked thereon, which form a part of this specification.
This invention relates to new and useful improvements in skirt markers or gages, and comprises the novel and advantageous features hereinafter described and claimed.

The object of the invention is to provide a skirt gage which is adapted to gage or measure lengths of skirts which vary only a few threads, longer or shorter as the case may be, which is often found necessary by dressmakers and fitters, in order to add a skirt braid or binding to the bottom of the skirt. This I am able to do by constructing the horizontal gage arm over which the skirt is gaged, of a small diameter of wire, and in further supporting said gage arm in a position as low as possible in the thimble which surrounds the graduated post. Two things are accomplished by these expedients; first— it is possible to make a narrow seam by pinning the skirt around the gage arm and thus enabling the wearer of the skirt to see the exact length without stitching the seam, and while the skirt is on the wearer and is being gaged; secondly—it is possible to bring the gage arm in close proximity to the floor and to thus gage the skirt in lengths varying within fractions of an inch or within a few threads of variation.

Preceding a detailed description of the invention, reference is made to the accompanying drawings, of which—

Figure 1, is an elevation of my improved dress skirt marker or gage. Fig. 2, is a detail illustration of a modified form of arm by the use of which a half inch length is marked or gaged. Fig. 3, illustrates the manner of marking or gaging a skirt on the wearer by means of my invention.

In a detail description of the invention, similar reference characters indicate corresponding parts.

The metallic base 1 is of sufficient weight to insure its being maintained stationary from accidental displacement; this base has a socket for the reception of a cylindrical rod 2 which is secured therein and which is provided with a marking scale or numerical indications which indicate from one to ten inches and fractional parts thereof as shown. Adapted to be secured at any desirable point on said graduated post or rod is a gaging arm 3 which is attached to a band ring 4 which fits over the post 2 and is made secure thereto at any point according to the length of the skirt desired, by means of a thumb screw 5. The band ring is provided with screw-threaded socket bosses 9 and 11 into which the gage arm 3 and the thumb screw 5 penetrate. The socket boss 11 it will be observed projects from the extreme lower end of the ring 4 and permits the gage arm 3 to occupy a position close to the base. As shown in Fig. 1, the gage arm 3 is at the lowest point and in such position will gage the length of a skirt to one inch from the floor; in order to obtain a gage of less than one inch, for example, one-half inch, a curved gage arm 6 is placed at the lower end of the rod 2 after removing the gage arm 3.

It will be understood that sufficient space be provided between the base or floor line 10 and the gage arm 3 or 6 for the operator's fingers in pinning up the lower edge of the skirt in marking or gaging the same. In Fig. 3 of the drawings, a dress skirt is shown in a position which it would occupy upon a wearer while being marked or gaged. The desired length is ascertained and the band ring 4 is placed at the proper figure upon the rod 2 and is there secured by tightening the screw 5. In operating the device as illustrated in Fig. 3, the wearer of the skirt turns to her left, while the operator works to her right, receiving the skirt from the left to pin it up over the gage arm, passing the finished length from the gage arm to the right; the pinned edge shows the wearer the desired length, and without further attention the garment is ready to be taken to the work room. In Fig. 3, 7 indicates the turned-up or overlapping portion of the skirt with the gage arm 3 lying between the fold and marking the length of the skirt; the turned-up or overlapping portion is thus secured by a suitable number of pins 8.

It will be observed that the gage arm 3 is considerably smaller in diameter than the scale post 2. This gage arm is essentially constructed of the smallest diameter of steel wire consistent with the requisite strength. The said arm being called upon to stand little or no strain, may be constructed of a very small gage of wire. This enables the material to be pinned above the gage arm and close to the edge of the skirt so that the operation of gaging the skirt creates a seam and obviates the necessity of stitching the up-turned portion in order that the wearer of a skirt may know the exact length after being gaged.

I claim:

A gage for measuring the lengths of skirts, the same comprising in combination, a supporting base, a scale post extending therefrom, an elongated band ring surrounding said scale post and having apertured bosses extending laterally from opposite ends thereof, a binding screw penetrating the apertured boss nearer the upper end of the ring to secure the ring to the post, a cylindrical gage arm formed from wire of a minimum diameter and supported in the apertured boss on the lower end of said ring, said gage arm owing to its minimum diameter and to its position on the ring being adapted to permit of the material being pinned close to the edge of the skirt in the operation of gaging the length thereof, and whereby lengths may be gaged which vary small fractional parts of an inch as compared one with the other.

In testimony whereof I affix my signature, in presence of two witnesses.

CARRIE WETZ.

Witnesses:
   R. J. McCarty,
   Geo. W. Mearich.